United States Patent
Inoue

(10) Patent No.: US 10,502,973 B2
(45) Date of Patent: Dec. 10, 2019

(54) SHAKE CORRECTION DEVICE

(71) Applicant: OLYMPUS CORPORATION, Hachioji-shi, Tokyo (JP)

(72) Inventor: Yosuke Inoue, Kunitachi (JP)

(73) Assignee: OLYMPUS CORPORATION, Tokyo (JP)

(*) Notice: Subject to any disclaimer, the term of this patent is extended or adjusted under 35 U.S.C. 154(b) by 467 days.

(21) Appl. No.: 15/363,845

(22) Filed: Nov. 29, 2016

(65) Prior Publication Data
US 2017/0075132 A1 Mar. 16, 2017

Related U.S. Application Data

(63) Continuation of application No. PCT/JP2016/062386, filed on Apr. 19, 2016.

(30) Foreign Application Priority Data

Jul. 17, 2015 (JP) .................................. 2015-142685

(51) Int. Cl.
G02B 27/64 (2006.01)
G03B 5/00 (2006.01)
(Continued)

(52) U.S. Cl.
CPC .............. *G02B 27/646* (2013.01); *G03B 5/00* (2013.01); *H02K 41/0354* (2013.01);
(Continued)

(58) Field of Classification Search
CPC .............. G02B 27/646; H04N 5/23209; H04N 5/2253; H04N 5/23287; H04N 5/23258;
(Continued)

(56) References Cited

U.S. PATENT DOCUMENTS 8,295,694 B2   10/2012  Sogoh et al.
2006/0072913 A1*  4/2006  Noji ................... H04N 5/23248
                                                              396/55
(Continued)

FOREIGN PATENT DOCUMENTS

EP      1832912 A2    9/2007
JP      2006174588 A  6/2006
(Continued)

OTHER PUBLICATIONS

Machine Translation, Tomioka, JP-2014056145-A, Mar. 2014. (Year: 2014).*

(Continued)

*Primary Examiner* — Thomas Truong
(74) *Attorney, Agent, or Firm* — Holtz, Holtz & Volek PC

(57) ABSTRACT

A shake correction device includes a fixed member and movable member. The fixed member has one of three drive coils and three magnets. The movable member has other of the drive coils and the magnets. Three detectors are arranged on the fixed member or the movable member. A movement amount calculator calculates movement amounts and movement directions of operating points in the drive coils. A drive controller moves the movable member to apply to the drive coils based on outputs from the movement amount calculator. The drive coils are arranged such that imaginary lines passing through the operating points in the respective drive coils and parallel to long sides of the respective drive coils cross one another. Each of the detectors is arranged at a position with respect to the corresponding drive coil, where detection direction differs from a direction of a force acting on the operating point.

6 Claims, 6 Drawing Sheets

(51) Int. Cl.
  *H02K 41/00* (2006.01)
  *H02K 41/035* (2006.01)
  *H04N 5/225* (2006.01)
  *H04N 5/232* (2006.01)

(52) U.S. Cl.
  CPC ......... *H04N 5/2253* (2013.01); *H04N 5/2254* (2013.01); *H04N 5/23209* (2013.01); *H04N 5/23258* (2013.01); *H04N 5/23287* (2013.01); *H02K 2201/18* (2013.01)

(58) Field of Classification Search
  CPC ............ H04N 5/2254; H02K 41/0354; H02K 2201/18; H02K 41/00–065; G03B 5/00
  USPC ............................................. 310/12.01–12.33
  See application file for complete search history.

(56) References Cited

U.S. PATENT DOCUMENTS

| | | | |
|---|---|---|---|
| 2006/0127074 | A1 | 6/2006 | Noji |
| 2007/0212046 | A1* | 9/2007 | Sogoh ................... G02B 27/646 396/55 |
| 2014/0375829 | A1* | 12/2014 | Nishihara ................ G03B 5/00 348/208.7 |
| 2016/0080623 | A1 | 3/2016 | Nishihara et al. |

FOREIGN PATENT DOCUMENTS

| | | | |
|---|---|---|---|
| JP | 2007240736 A | | 9/2007 |
| JP | 2008122532 A | | 5/2008 |
| JP | 2009092888 A | | 4/2009 |
| JP | 2010197519 A | | 9/2010 |
| JP | 2011169715 A | | 9/2011 |
| JP | 2013207441 A | | 10/2013 |
| JP | 2014056145 A | * | 3/2014 |
| JP | 2014056145 A | | 3/2014 |
| JP | 2015121637 A | | 7/2015 |
| JP | 2016109889 A | | 6/2016 |

OTHER PUBLICATIONS

Extended European Search Report (EESR) dated Feb. 19, 2019 issued in counterpart European Application No. 16827476.9.
Chinese Office Action (and English language translation thereof) dated Nov. 2, 2018 issued in counterpart Chinese Application 201680002037.5.
International Preliminary Report on Patentability (IPRP) dated Jan. 23, 2018 issued in counterpart International Application No. PCT/JP2016/062386.
International Search Report (ISR) and Written Opinion dated Aug. 2, 2016 issued in International Application No. PCT/JP2016/062386.
International Search Report (ISR) dated Aug. 2, 2016 issued in International Application No. PCT/JP2016/062386.
Japanese Office Action dated Mar. 26, 2019 (and English translation thereof) issued in counterpart Japanese Application No. 2015-142685.
Chinese Office Action dated Jun. 6, 2019 (and English translation thereof) issued in counterpart Chinese Application Vo. 201680002037_5 x.

* cited by examiner

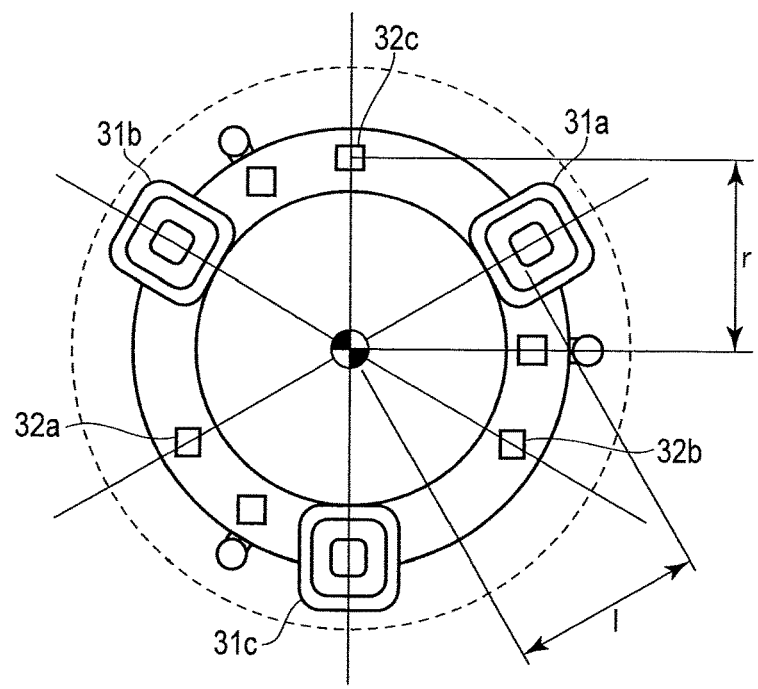
F I G. 6
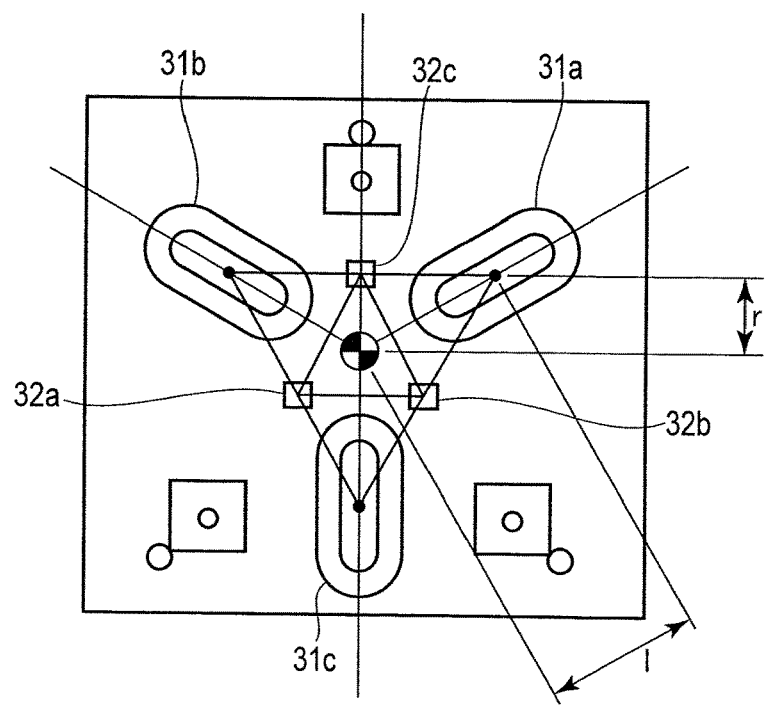
F I G. 7

US 10,502,973 B2

SHAKE CORRECTION DEVICE

CROSS-REFERENCE TO RELATED APPLICATIONS

This application is a Continuation application of PCT Application No. PCT/JP2016/062386, filed Apr. 19, 2016 and based upon and claiming the benefit of priority from the prior Japanese Patent Application No. 2015-142685, filed Jul. 17, 2015, the entire contents of both of which are incorporated herein by reference.

BACKGROUND OF THE INVENTION

1. Field of the Invention

The present invention relates to a shake correction device.

2. Description of the Related Art

A shake correction device is a device to correct the influence of shakes, etc. in an imaging apparatus by moving a movable member on which a lens or an image sensor is mounted. Relating to the configuration of this shake correction device, Jpn. Pat. Appln. KOKAI Publication No. 2010-197519 proposes a shake correction device (optical correction unit) having three drive parts constituted by a movable member with three magnets arranged around a lens and a fixed member with three drive coils corresponding to the respective magnets. In the shake correction device of Jpn. Pat. Appln. KOKAI Publication No. 2010-197519, the three drive coils are arranged at 120° intervals with their long sides each facing the tangential direction of the circumference of a circle that has a center on the optical axis. In the shake correction device of Jpn. Pat. Appln. KOKAI Publication No. 2010-197519, three hall elements are arranged inside windings that form the drive coils, in order to detect the position of the movable member. Also, Jpn. Pat. Appln. KOKAI Publication No. 2006-174588 proposes a shake correction device having three drive parts constituted by a movable member with three magnets arranged around a lens and a fixed member with three drive coils corresponding to the respective magnets. In the shake correction device of Jpn. Pat. Appln. KOKAI Publication No. 2006-174588, too, three hall elements are arranged inside windings that form the drive coils, in order to detect the position of the movable member.

BRIEF SUMMARY OF THE INVENTION

A shake correction device according to an aspect of the invention comprises: a fixed member on which one of three drive coils and three magnets provided to face the three drive coils are arranged; a movable member on which one of an optical element and an image sensor, and other of the three drive coils and the three magnets are arranged, the movable member being movable with respect to the fixed member; three detectors arranged on the fixed member or the movable member on which the three drive coils are arranged, the three detectors arranged to correspond to the respective three drive coils; a movement amount calculator which calculates movement amounts and movement directions of operating points in the three drive coils based on outputs from the three detectors; and a drive controller which moves the movable member by controlling currents to apply to the three drive coils based on outputs from the movement amount calculator, wherein the three drive coils are arranged such that imaginary lines passing through the operating points in the respective three drive coils and parallel to long sides of the respective three drive coils cross one another, and each of the three detectors is arranged at a position with respect to the corresponding drive coil, where detection direction differs from a direction of a force acting on the operating point in the corresponding drive coil.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWINGS

The accompanying drawings, which are incorporated in and constitute a part of the specification, illustrate embodiments of the invention, and together with the general description given above and the detailed description of the embodiments given below, serve to explain the principles of the invention.

FIG. 6 illustrates an example where the arrangement relationship gives AA=210°, AB=330°, AC=90°, 1A=1B=1C=1, αa=30°, αb=150°, αc=270°, and ra=rb=rc=r in FIG. 5;

FIG. 7 illustrates an example where the arrangement relationship gives 2r=1 in FIG. 6.

DETAILED DESCRIPTION OF THE INVENTION

Figure 1:
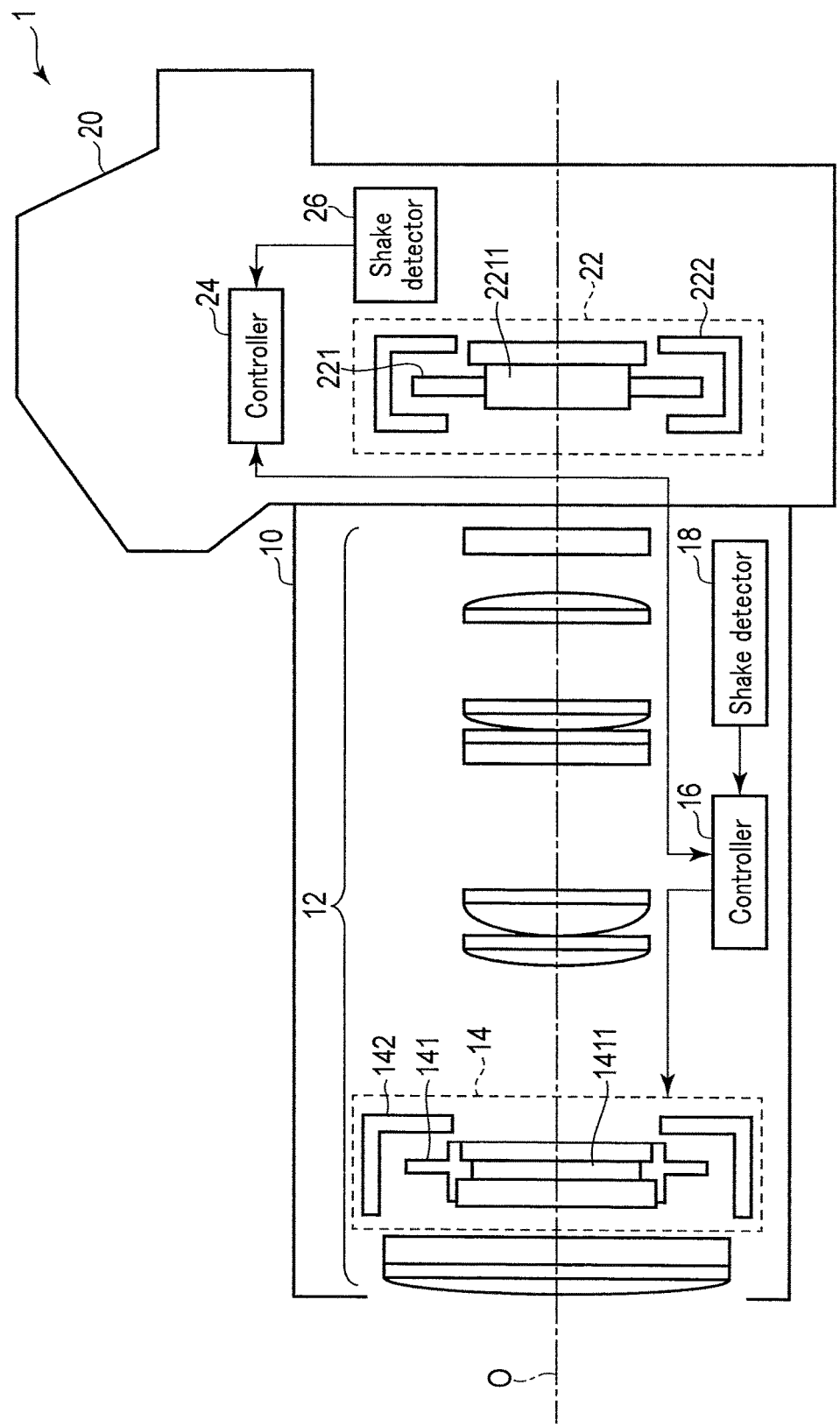
FIG. 1 illustrates an overview configuration of an imaging apparatus according to one embodiment of the present invention.

Hereinafter, embodiments of the present invention will be described with reference to the drawings. FIG. 1 illustrates an overview configuration of an imaging apparatus according to one embodiment of the present invention. An imaging apparatus 1 shown in FIG. 1 comprises a lens unit 10 and a camera body 20. The lens unit 10 is attached to the camera body 20 via a mount (not shown) provided on the camera body 20. With the lens unit 10 attached to the camera body 20, the lens unit 10 and the camera body 20 are communicatively connected. The lens unit 10 and the camera body 20 thereby operate in cooperation with each other. Note that the imaging apparatus 1 is not necessarily an imaging apparatus of a lens-interchangeable type. For example, the imaging apparatus 1 may be an imaging apparatus of a lens-integrated type.

The lens unit 10 comprises an imaging optical system 12, a controller 16, and a shake detector 18. The imaging optical system 12 comprises, for example, a plurality of lenses and apertures, and allows a light flux from an object (not shown) to be incident on an image sensor 2211 of a body shake correction unit 22 of the camera body 20. The imaging optical system 12 in FIG. 1 comprises a plurality of lenses, but the imaging optical system 12 may comprise one lens.

Also, the imaging optical system 12 may comprise a focus lens or may be constituted as a zoom lens. In such cases, at least part of the lenses of the imaging optical system 12 are movably configured in a Z direction that is a direction along an optical axis O.

Also, the imaging optical system 12 in this embodiment comprises a lens shake correction unit 14. The lens shake correction unit 14 comprises a movable member 141 comprising a lens 1411 as an optical element constituting the imaging optical system 12, and a fixed member 142 fixed to the body of the lens unit 10. This lens shake correction unit 14 moves the movable member 141 through voice coil motors (VCMs) constituted by the movable member 141 and the fixed member 142. The configuration of the lens shake correction unit 14 will be described in detail later.

The controller 16 comprises, for example, a CPU or ASIC, and controls each operation of the lens unit 10 according to the control of a controller 24. For example, the controller 16 performs control of the lens shake correction unit 14.

The shake detector 18 is, for example, a gyro sensor, and detects a shake that occurs to the lens unit 10.

The camera body 20 comprises the body shake correction unit 22, the controller 24, and a shake detector 26.

The body shake correction unit 22 comprises a movable member 221 with the image sensor 2211, and a fixed member 222 fixed to the body of the camera body 20. By imaging an object (not shown), the image sensor 2211 generates an image related to the object. Also, the body shake correction unit 22 moves the movable member 221 through voice coil motors (VCMs) constituted by the movable member 221 and the fixed member 222. The configuration of the body shake correction unit 22 will be described in detail later.

The controller 24 comprises, for example, a CPU or ASIC, and controls each operation of the camera body 20. For example, the controller 24 performs control of the body shake correction unit 22.

The shake detector 26 is, for example, a gyro sensor, and detects a shake that occurs to the camera body 20.

Figure 2:
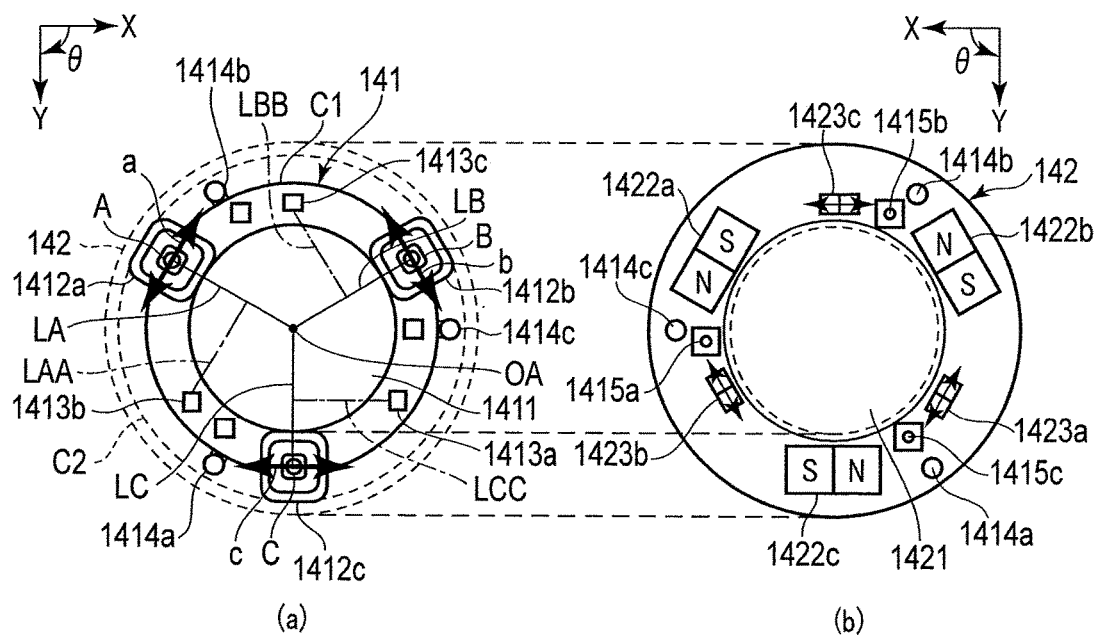
FIG. 2 illustrates a mechanical configuration of one example of a lens shake correction unit.

The configuration of the lens shake correction unit 14 will be further described. FIG. 2 illustrates a mechanical configuration of one example of the lens shake correction unit 14. Herein, FIG. 2(*a*) shows the configuration of the movable member 141, and FIG. 2(*b*) shows the configuration of the fixed member 142.

As shown in FIG. 2(*a*), the movable member 141 is a substantially annular member and holds the lens 1411 at its inner peripheral portion. At the outer peripheral portion of this movable member 141, drive coils 1412*a*, 1412*b*, and 1412*c* are arranged as three drive coils. For example, these three drive coils 1412*a*, 1412*b*, and 1412*c* are formed of windings of a substantially rectangular shape, and arranged with their longitudinal directions facing the center OA of the lens 1411 and at equal 120° intervals with respect to the center OA of the lens 1411.

In this instance, operating points A, B, and C of the drive forces in the three drive coils 1412*a*, 1412*b*, and 1412*c* (e.g., positions of the center of gravity of the respective drive coils 1412*a*, 1412*b*, and 1412*c*) locate on the same circumference. Also, imaginary lines LA, LB, and LC passing through the operating points A, B, and C in the drive coils 1412*a*, 1412*b*, and 1412*c* and parallel to the long sides of the drive coils 1412*a*, 1412*b*, and 1412*c* cross one another at the center OA of the lens 1411.

At the outer peripheral portion of the movable member 141, hall elements 1413*a*, 1413*b*, and 1413*c* are arranged as three detectors. For example, these three hall elements 1413*a*, 1413*b*, and 1413*c* are arranged within the regions formed by an imaginary circle C1 that contacts the short sides of the drive coils 1412*a*, 1412*b*, and 1412*c* which are on the inner circumferential side of the movable member 141 (assumed to be the front ends of the drive coils 1412*a*, 1412*b*, and 1412*c*), an imaginary circle C2 that contacts the short sides of the drive coils 1412*a*, 1412*b*, and 1412*c* which are on the outer circumferential side of the movable member 141 (assumed to be the rear ends of the drive coils 1412*a*, 1412*b*, and 1412*c*), and the long sides of the respective three drive coils 1412*a*, 1412*b*, and 1412*c*.

In this instance, the three hall elements 1413*a*, 1413*b*, and 1413*c* are arranged on the respective imaginary vertical lines LAA, LBB, and LCC passing through the operating points A, B, and C in the drive coils 1412*a*, 1412*b*, and 1412*c* and vertical to the long sides of the respective drive coils 1412*a*, 1412*b*, and 1412*c*. In FIG. 2(*a*), the imaginary vertical lines LAA, LBB, and LCC are perpendicular bisectors of the imaginary lines LA, LB, and LC.

According to this embodiment, the hall elements 1413*a*, 1413*b*, and 1413*c* are not arranged inside the windings that form drive coils 1412*a*, 1412*b*, and 1412*c*, but outside the same. This is for avoiding the influence of magnetic flux generated from the drive coils 1412*a*, 1412*b*, and 1412*c* as much as possible, and also for preventing size increase of the drive coils 1412*a*, 1412*b*, and 1412*c* when adopting a configuration where the hall elements 1413*a*, 1413*b*, and 1413*c* are arranged in the air-core portions of the drive coils 1412*a*, 1412*b*, and 1412*c*.

As shown in FIG. 2(*b*), the fixed member 142 is a substantially annular member corresponding to the movable member 141, and comprises at its inner peripheral portion an opening 1421 having a diameter equivalent to the lens 1411. At the positions on the fixed member 142 which correspond to the drive coils 1412*a*, 1412*b*, and 1412*c*, three permanent magnets 1422*a*, 1422*b*, and 1422*c* are arranged. Also, at the positions on the fixed member 142 which correspond to the hall elements 1413*a*, 1413*b*, and 1413*c*, three permanent magnets 1423*a*, 1423*b*, and 1423*c* for position detection are arranged.

By applying a current to the drive coils 1412*a*, 1412*b*, and 1412*c* of the movable member 141, drive forces toward the directions as shown by arrows a, b, and c in the drawing are generated at the operating points A, B, and C through the interactions with the magnetic fields existing at the permanent magnets 1422*a*, 1422*b*, and 1422*c*. The movable member 141 whereby moves smoothly within the plane orthogonal to the optical axis O of the lens 1411. As such, according to this embodiment, the combination of the drive coils 1412*a*, 1412*b*, and 1412*c* and the permanent magnets 1422*a*, 1422*b*, and 1422*c* form voice coil motors (VCMs) as three drive parts. Also, when the movable member 141 moves according to the drive forces generated in the drive coils 1412*a*, 1412*b*, and 1412*c*, the sizes of the magnetic fields received by the hall elements 1413*a*, 1413*b*, and 1413*c* change. From the changes in the magnetic fields, the relative position of the movable member 141 to the fixed member 142 is detected. By controlling the sizes of the currents applied to the drive coils 1412*a*, 1412*b*, and 1412*c* according to this position, the position of the movable member 141 is controlled.

Also, for example, three springs 1414*a*, 1414*b*, and 1414*c* are attached to the movable member 141. The movable member 141 is pushed against the fixed member 142 by these springs 1414*a*, 1414*b*, and 1414*c*. Further, balls 1415*a*, 1415*b*, and 1415*c* are provided between the movable member 141 and the fixed member 142. By the function of these balls 1415a, 1415b, and 1415c, the movable member 141 smoothly moves within the plane orthogonal to the optical axis O of the lens 1411 while being pushed by the springs 1414a, 1414b, and 1414c.

Figure 3A:
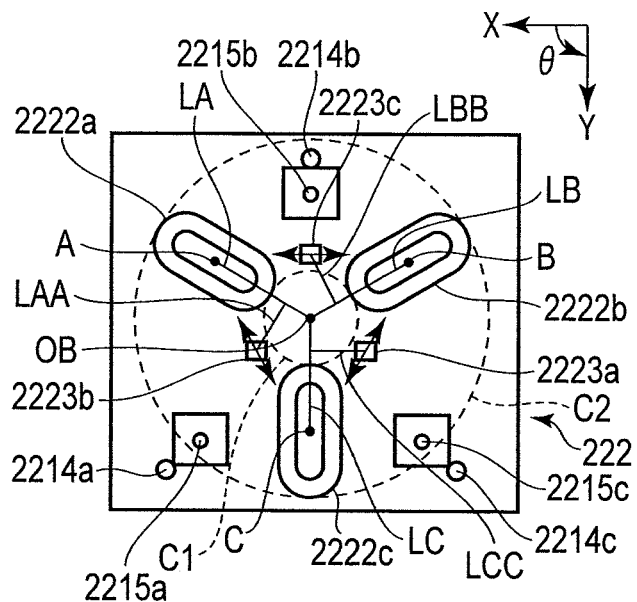
FIG. 3A illustrates a mechanical configuration of a fixed member of one example of a body shake correction unit.
Figure 3B:
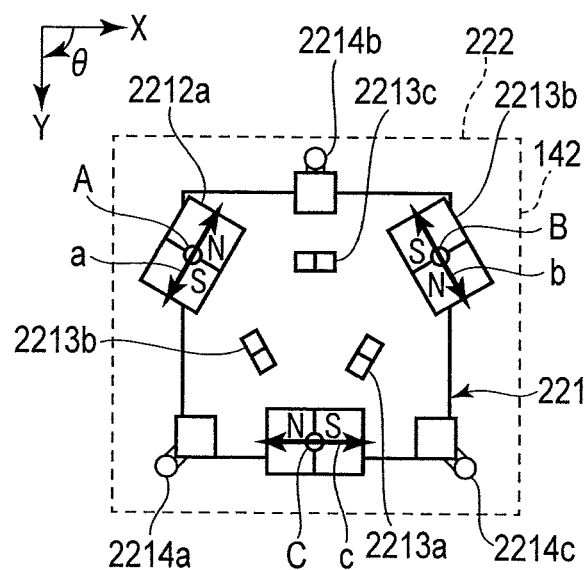
FIG. 3B illustrates a mechanical configuration of a movable member of one example of a body shake correction unit.

The configuration of the body shake correction unit 22 will be further described. FIG. 3 illustrate a mechanical configuration of one example of the body shake correction unit 22. Herein, FIG. 3A shows the configuration of the fixed member 222, and FIG. 3B shows the configuration of the movable member 221. Note that FIG. 3B is a drawing to show the configuration of a side of the movable member 221 where the image sensor 2211 is not mounted.

As shown in FIG. 3A, the fixed member 222 is a substantially rectangular member. On this fixed member 222, drive coils 2222a, 2222b, and 2222c are arranged as three drive coils. For example, these three drive coils 2222a, 2222b, and 2222c are formed of windings of a substantially rectangular shape, and arranged with their longitudinal directions facing the center OB and at equal 120° intervals with respect to the center OB. The center OB is a position on the fixed member 222 in the vicinity of the optical axis O.

In this instance, operating points A, B, and C of the drive forces in the three drive coils 2222a, 2222b, and 2222c (e.g., positions of the center of gravity of the respective drive coils 2222a, 2222b, and 2222c) locate on the same circumference. Also, imaginary lines LA, LB, and LC passing through the operating points A, B, and C in the drive coils 2222a, 2222b, and 2222c and parallel to the long sides of the drive coils 2222a, 2222b, and 2222c cross one another at the center OB.

Also, hall elements 2223a, 2223b, and 2223c are arranged on the fixed member 222 as three detectors. For example, these three hall elements 2223a, 2223b, and 2223c are arranged in the regions formed by an imaginary circle C1 that contacts the short sides of the drive coils 2222a, 2222b, and 2222c which are on the inner circumferential side of the fixed member 222 (assumed to be the front ends of the drive coils 2222a, 2222b, and 2222c), an imaginary circle C2 that contacts the short sides of the drive coils 2222a, 2222b, and 2222c which are on the outer circumferential side of the fixed member 222 (assumed to be the rear ends of the drive coils 2222a, 2222b, and 2222c), and the respective long sides of the three drive coils 2222a, 2222b, and 2222c.

In this instance, the three hall elements 2223a, 2223b, and 2223c are arranged on the respective imaginary vertical lines LAA, LBB, and LCC passing through the operating points A, B, and C in the drive coils 2222a, 2222b, and 2222c and vertical to the long sides of the drive coils 2222a, 2222b, and 2222c, respectively.

According to this embodiment, the hall elements 2223a, 2223b, and 2223c are not arranged inside the windings that form the drive coils 2222a, 2222b, and 2222c, but outside the same. This is for avoiding the influence of magnetic flux generated from the drive coils 2222a, 2222b, and 2222c as much as possible, and also for preventing size increase of the drive coils 2222a, 2222b, and 2222c when adopting a configuration where the hall elements 2223a, 2223b, and 2223c are arranged in the air-core portions of the drive coils 2222a, 2222b, and 2222c.

As shown in FIG. 3B, the movable member 221 is a substantially rectangular member corresponding to the fixed member 222, and comprises the image sensor 2211. At the positions on the movable member 221 which correspond to the drive coils 2222a, 2222b, and 2222c, three permanent magnets 2212a, 2212b, and 2212c are arranged. Also, at the positions on the movable member 221 which correspond to the hall elements 2223a, 2223b, and 2223c, three permanent magnets 2213a, 2213b, and 2213c for position detection are arranged. By applying a current to the drive coils 2222a, 2222b, and 2222c of the fixed member 222, drive forces toward the directions as shown by arrows a, b, and c in the drawing are generated at the operating points A, B, and C through the interactions with the magnetic fields existing at the permanent magnets 2212a, 2212b, and 2212c. The movable member 221 thereby moves smoothly within the plane orthogonal to the optical axis O of the lens 1411. As such, according to this embodiment, the combination of the drive coils 2222a, 2222b, and 2222c and the permanent magnets 2212a, 2212b, and 2212c form voice coil motors (VCMs) as three drive parts. Also, when the movable member 221 moves according to the drive forces generated in the drive coils 2222a, 2222b, and 2222c, the sizes of the magnetic fields received by the hall elements 2223a, 2223b, and 2223c change. From the changes in the magnetic fields, the relative position of the movable member 221 to the fixed member 222 is detected. By controlling the sizes of the currents applied to the drive coils 2222a, 2222b, and 2222c according to this position, the position of the movable member 221 is controlled.

Also, for example, three springs 2214a, 2214b, and 2214c are attached to the movable member 221. The movable member 221 is pushed against the fixed member 222 by these springs 2214a, 2214b, and 2214c. Further, balls 2215a, 2215b, and 2215c are provided between the movable member 221 and the fixed member 222. By the function of these balls 2215a, 2215b, and 2215c, the movable member 221 smoothly moves within the plane orthogonal to the optical axis O of the lens 1411 while being pushed by the springs 2214a, 2214b, and 2214c.

Figure 4:
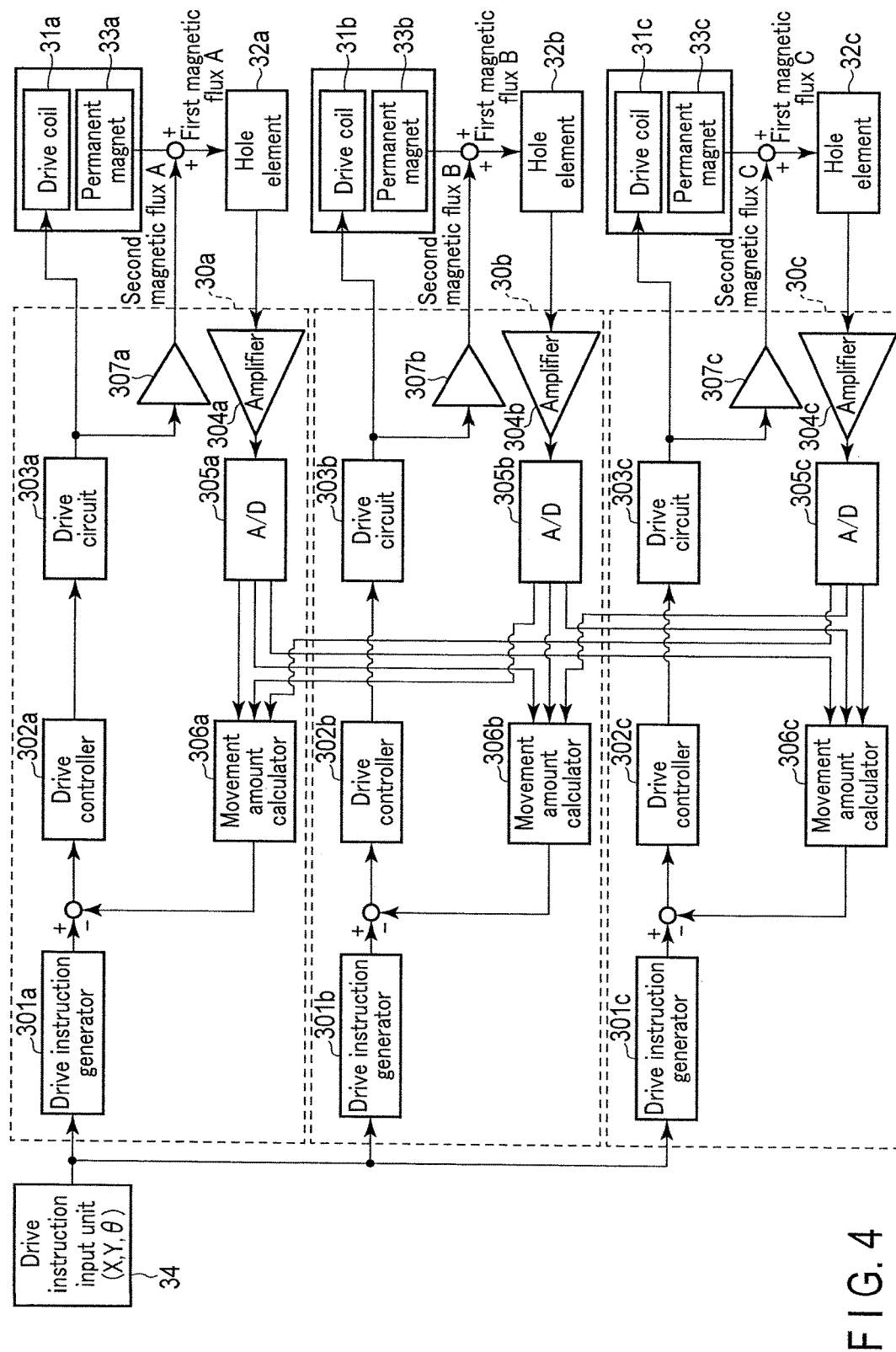
FIG. 4 is a block diagram for the position control of a movable member in an imaging apparatus.

FIG. 4 is a block diagram for the position control of the movable member in the imaging apparatus 1 according to this embodiment. The configuration of FIG. 4 is provided for each of the controller 16 and the controller 24. The lens shake correction unit 14 and the body shake correction unit 22 do not differ in the block diagram for the position control of the movable member. Therefore, the descriptions will be given without particularly differentiating one from another.

Also, for the sake of explanation, the drive coil 1412a and the drive coil 2222a will be both referred to as a drive coil 31a, the drive coil 1412b and the drive coil 2222b will be both referred to as a drive coil 31b, and the drive coil 1412c and the drive coil 2222c will be both referred to as a drive coil 31c. The hall element 1413a and the hall element 2223a will be both referred to as a hall element 32a, the hall element 1413b and the hall element 2223b will be both referred to as a hall element 32b, and the hall element 1413c and the hall element 2223c will be both referred to as a hall element 32c. The permanent magnet 1423a and the permanent magnet 2213a for position detection will be both referred to as a permanent magnet 33a, the permanent magnet 1423b and the permanent magnet 2213b for position detection will be both referred to as a permanent magnet 33b, and the permanent magnet 1423c and the permanent magnet 2213c for position detection will be both referred to as a permanent magnet 33c.

Figure 5:
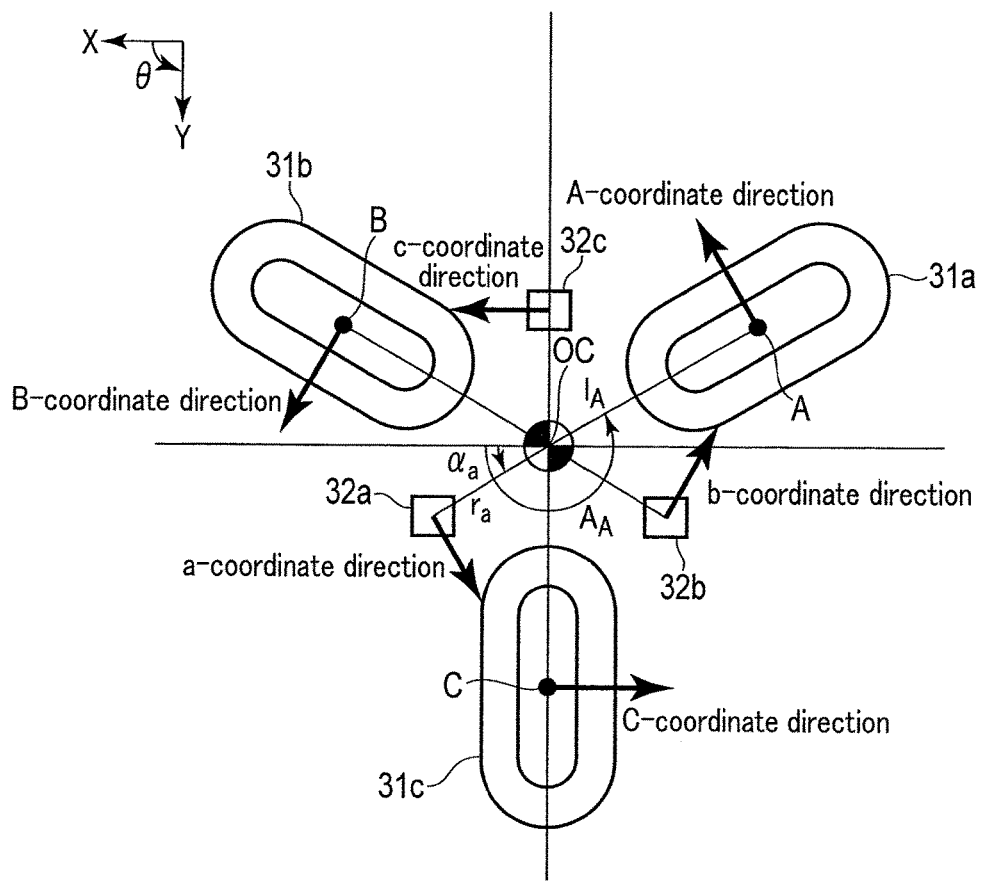
FIG. 5 illustrates one example of the arrangements of drive coils and hall elements.

Further, an X-Y coordinate system will be defined as shown in FIG. 5, taking the intersection OC of the imaginary lines LA, LB, and LC extending from the operating points A, B, and C of the drive coils 31a, 31b, and 31c as an origin. Here, the rotational amount for the X-axis and the Y-axis is given as θ. Also, directions in which the drive forces of the drive coils 31a, 31b, and 31c are exerted will be referred to as an A-coordinate direction, a B-coordinate direction, and a C-coordinate direction, respectively. Detection directions of the hall elements 32a, 32b, and 32c will be referred to as an a-coordinate direction, a b-coordinate direction, and a c-coordinate direction, respectively. In this instance, positions PA, PB, and PC of the operating points A, B, and C of the drive coils 31a, 31b, and 31c, and positions pa, pb, and pc of the centers of the hall elements 32a, 32b, and 32c will be each expressed in polar coordinates as follows.

PA: (1A cos AA, 1A sin AA)
PB: (1B cos AB, 1B sin AB)
PC: (1C cos AC, 1C sin AC)
pa: (ra cos αa, ra sin αa)
pb: (rb cos αb, rb sin αb)
pc: (rc cos αc, rc sin αc)

Here, 1A is a distance between the position PA and the origin OC, 1B is a distance between the position PB and the origin OC, and 1C is a distance between the position PC and the origin OC. Also, AA is an angle formed by the X-axis and the imaginary line LA, AB is an angle formed by the X-axis and the imaginary line LB, and AC is an angle formed by the X-axis and the imaginary line LC. Also, ra is a distance between the position pa and the origin OC, rb is a distance between the position pb and the origin OC, and rc is a distance between the position pc and the origin OC. Also, αa is an angle formed by the X-axis and the imaginary line La that connects the position pa and the origin OC, αb is an angle formed by the X-axis and the imaginary line Lb that connects the position pb and the origin OC, and αc is an angle formed by the X-axis and the imaginary line Lc that connects the position pc and the origin OC.

As shown in FIG. 4, the controller comprises three feedback circuits 30a, 30b, and 30c. The feedback circuit 30a is a feedback circuit for the current control of the drive coil 31a. Also, the feedback circuit 30b is a feedback circuit for the current control of the drive coil 31b. Further, the feedback circuit 30c is a feedback circuit for the current control of the drive coil 31c. To these feedback circuits 30a, 30b, and 30c, information about the drive target of the movable member is input from a drive instruction input unit 34. The information about the drive target includes a targeted movement amount Δx in the X direction, a targeted movement amount Δy in the Y direction, and a rotational amount Δθ. Such information of the drive target is set according to, for example, an amount of shake detected by the shake detector 18 or 26.

The feedback circuit 30a comprises a drive instruction generator 301a, a drive controller 302a, a drive circuit 303a, an amplifier 304a, an analog/digital (A/D) converter 305a, and a movement amount calculator 306a. The feedback circuit 30b comprises a drive instruction generator 301b, a drive controller 302b, a drive circuit 303b, an amplifier 304b, an analog/digital (A/D) converter 305b, and a movement amount calculator 306b. The feedback circuit 30c comprises a drive instruction generator 301c, a drive controller 302c, a drive circuit 303c, an amplifier 304c, an analog/digital (A/D) converter 305c, and a movement amount calculator 306c.

The drive instruction generator 301a converts the drive target (Δx, Δy, Δθ) of the movable member, input from the drive instruction input unit 34, into a drive target ΔPAt that is based on the A-coordinate direction. The drive instruction generator 301b converts the drive target (Δx, Δy, Δθ) of the movable member, input from the drive instruction input unit 34, into a drive target ΔPBt that is based on the B-coordinate direction. The drive instruction generator 301c converts the drive target (Δx, Δy, Δθ) of the movable member, input from the drive instruction input unit 34, into a drive target ΔPCt that is based on the C-coordinate direction. These conversions are performed in accordance with the following equation 1.

$$\begin{pmatrix} \Delta PA_t \\ \Delta PB_t \\ \Delta PC_t \end{pmatrix} = \begin{pmatrix} -\sin A_A & \cos A_A & l_A \\ -\sin A_B & \cos A_B & l_B \\ -\sin A_C & \cos A_C & l_C \end{pmatrix} \begin{pmatrix} \Delta x \\ \Delta y \\ \Delta \theta \end{pmatrix} \quad \text{[Equation 1]}$$

The drive controller 302a comprises a digital filter configured by the combination of multiple infinite impulse response (IIR) filters, and outputs to the drive circuit 303a a drive current value generated based on the deviation between the drive target that is based on the A-coordinate direction and output from the drive instruction generator 301a and a present position output from the movement amount calculator 306a. The drive controller 302b comprises a digital filter configured by the combination of multiple IIR filters, and outputs to the drive circuit 303b a drive current value generated based on the deviation between the drive target that is based on the B-coordinate direction and output from the drive instruction generator 301b and a present position output from the movement amount calculator 306b. The drive controller 302c comprises a digital filter configured by the combination of multiple IIR filters, and outputs to the drive circuit 303c a drive current value generated based on the deviation between the drive target that is based on the C-coordinate direction and output from the drive instruction generator 301c and a present position output from the movement amount calculator 306c. These drive current values represent the values of currents required to apply to the drive coils 31a, 31b, and 31c in order to drive the movable member to a target position, and the values are generated by, for example, applying a digital filter to the deviation.

The drive circuit 303a supplies a current to the drive coil 31a based on the drive current value output from the drive controller 302a. The drive circuit 303b supplies a current to the drive coil 31b based on the drive current value output from the drive controller 302b. The drive circuit 303c supplies a current to the drive coil 31c based on the drive current value output from the drive controller 302c.

The amplifier 304a amplifies a first magnetic-flux information signal output from the hall element 32a. The amplifier 304b amplifies a first magnetic-flux information signal output from the hall element 32b. The amplifier 304c amplifies a first magnetic-flux information signal output from the hall element 32c. Amplification factors of the amplifiers 303a, 303b, and 303c are set according to the position-detection resolution of the movable member. For example, a large amplification factor is set when high resolution is required.

The first magnetic-flux information signal output from the hall element 32a includes a magnetic-flux information signal based on a magnetic flux from the permanent magnet 33a for position detection. Further, the first magnetic-flux information signal output from the hall element 32a includes a signal based on a second magnetic flux generated due to the flow of a current in the drive coil 31a. In FIG. 4, the second magnetic flux is shown as a product from an imaginary magnetic flux generator 307a that corresponds to the drive coil 31a. Hence the hall element 32a is shown as an element to output the first magnetic-flux information signal of a state that the second magnetic flux generated at the magnetic flux generator 307a is superimposed on the magnetic flux from the permanent magnet 33a. Similarly, the hall element 32b is shown as an element to output the first magnetic-flux information signal of a state that the second magnetic flux generated at a magnetic flux generator 307b is superimposed on the magnetic flux from the permanent magnet 33b, and the hall element 32c is shown as an element to output the first magnetic-flux information signal of a state that the second magnetic flux generated at a magnetic flux generator 307c is superimposed on the magnetic flux from the permanent magnet 33c.

The A/D converter 305a converts the first magnetic-flux information signal amplified at the amplifier 304a into a digital value. The A/D converter 305b converts the first magnetic-flux information signal amplified at the amplifier 304b into a digital value. The A/D converter 305c converts the first magnetic-flux information signal amplified at the amplifier 304c into a digital value.

The movement amount calculator 306a calculates the present position of the movable member based on the first magnetic-flux information signals from the A/D converters 305a, 305b, and 305c. The movement amount calculator 306b calculates the present position of the movable member based on the first magnetic-flux information signals from the A/D converters 305a, 305b, and 305c. The movement amount calculator 306c calculates the present position of the movable member based on the first magnetic-flux information signals from the A/D converters 305a, 305b, and 305c. Based on these calculated present positions, the drive controllers 302a, 302b, and 302c update the drive current values.

Hereinafter, the operations of the imaging apparatus 1 shown in FIG. 4 will be described. For example, when a shake occurs, the drive instruction input unit 34 outputs a drive target. That is, the drive instruction input unit 34 generates a drive target ($\Delta x$, $\Delta y$, $\Delta \theta$) such that the movable member will be driven to a position to cancel out the image blur due to the shake, etc.

The drive target ($\Delta x$, $\Delta y$, $\Delta \theta$) is a drive target of the movable member as a whole, which is based on the X-Y coordinate. For the sake of later calculation, the drive instruction generator 301a converts the drive target ($\Delta x$, $\Delta y$, $\Delta \theta$) of the movable member, input from the drive instruction input unit 34, into a drive target $\Delta$PAt that is based on the A-coordinate direction. The drive instruction generator 301b converts the drive target ($\theta x$, $\Delta y$, $\Delta \theta$) of the movable member, input from the drive instruction input unit 34, into a drive target $\Delta$PBt that is based on the B-coordinate direction. The drive instruction generator 301c converts the drive target ($\Delta x$, $\Delta y$, $\Delta \theta$) of the movable member, input from the drive instruction input unit 34, into a drive target $\Delta$PCt that is based on the C-coordinate direction.

The drive controller 302a generates a drive current value based on the deviation between the target position given from the drive instruction generator 301a and the present position given from the movement amount calculator 306a and sets the generated drive current value for the drive circuit 303a. The drive circuit 303a outputs a current corresponding to the drive current value to the drive coil 31a. The drive controller 302b generates a drive current value based on the deviation between the target position given from the drive instruction generator 301b and the present position given from the movement amount calculator 306b and sets the generated drive current value for the drive circuit 303b. The drive circuit 303b outputs a current corresponding to the drive current value to the drive coil 31b. The drive controller 302c generates a drive current value based on the deviation between the target position given from the drive instruction generator 301c and the present position given from the movement amount calculator 306c and sets the generated drive current value for the drive circuit 303c. The drive circuit 303c outputs a current corresponding to the drive current value to the drive coil 31c. The movable member moves according to the total force of the drive forces generated at these drive coils 31a, 31b, and 31c, respectively.

When the movable member moves, the hall element 32a detects a first magnetic flux in which a magnetic flux from the permanent magnet 33a and a second magnetic flux that accompanies the supply of a current to the drive coil 31a are included. Also, the hall element 32b detects a first magnetic flux in which a magnetic flux from the permanent magnet 33b and a second magnetic flux that accompanies the supply of a current to the drive coil 31b are included. Also, the hall element 32c detects a first magnetic flux in which a magnetic flux from the permanent magnet 33c and a second magnetic flux that accompanies the supply of a current to the drive coil 31c are included. Controlling the position of the movable member based on such first magnetic fluxes would result in the position control involving as many errors as number of second magnetic fluxes. While this embodiment reduces the influences of the second magnetic fluxes by arranging the hall elements outside the coils, the second magnetic fluxes may be detected and a correction processing to remove their influences may be performed.

When the first magnetic-flux information signal is output from the hall element 32a, the amplifier 304a amplifies the first magnetic-flux information signal by a predetermined amplification factor. Then the A/D converter 305a samples and converts the first magnetic-flux information signal amplified at the amplifier 304a into a digital value. The amplifier 304b likewise amplifies the first magnetic-flux information signal by a predetermined amplification factor. Then the A/D converter 305b samples and converts the first magnetic-flux information signal amplified at the amplifier 304b into a digital value. Also, the amplifier 304c amplifies the first magnetic-flux information signal by a predetermined amplification factor. Then the A/D converter 305c samples and converts the first magnetic-flux information signal amplified at the amplifier 304c into a digital value.

When the first magnetic-flux information signals are taken by the A/D converters 305a, 305b, and 305c, the movement amount calculators 306a, 306b, and 306c calculate the movement amounts and movement directions of the operating points A, B, and C of the drive coils 31a, 31b, and 31c. This calculation will be described.

First, the movement amount calculators 306a, 306b, and 306c calculate the present positions $\Delta$pa, $\Delta$pb, and $\Delta$pc of the respective hall elements 32a, 32b, and 32c from the first magnetic-flux information signals. For example, the movement amount calculators 306a, 306b, and 306c store tables associating magnetic fluxes with positions. The movement amount calculators 306a, 306b, and 306c calculate the center positions $\Delta$pa, $\Delta$pb, and $\Delta$pc of the hall elements 32a, 32b, and 32c from the first magnetic-flux information signals with reference to the tables.

Next, the movement amount calculators 306a, 306b, and 306c convert the present positions $\Delta$pa, $\Delta$pb, and $\Delta$pc, obtained based on the positions of the hall elements 32a, 32b, and 32c, into present positions $\Delta$PA, $\Delta$PB, and $\Delta$PC that are based on the positions of the operating points A, B, and C of the drive coils 31a, 31b, and 31c. This conversion is performed in accordance with the following equation 2.

$$\begin{pmatrix} \Delta PA \\ \Delta PB \\ \Delta PC \end{pmatrix} = BA^{-1} \begin{pmatrix} \Delta pa \\ \Delta pb \\ \Delta pc \end{pmatrix} \quad \text{[Equation 2]}$$

wherein $A^{-1}$ is an inverse matrix of matrix A, and $$A = \begin{pmatrix} -\sin\alpha_a & \cos\alpha_a & r_a \\ -\sin\alpha_b & \cos\alpha_b & r_b \\ -\sin\alpha_c & \cos\alpha_c & r_c \end{pmatrix},$$

$$B = \begin{pmatrix} -\sin A_A & \cos A_A & l_A \\ -\sin A_B & \cos A_B & l_B \\ -\sin A_C & \cos A_C & l_C \end{pmatrix}$$

The current that is output to the drive coil 31a is controlled based on the deviation between the drive target ΔPAt and the present position ΔPA. The current that is output to the drive coil 31b is controlled based on the deviation between the drive target ΔPBt and the present position. APB. The current that is output to the drive coil 31c is controlled based on the deviation between the drive target ΔPCt and the present position ΔPC.

According to this embodiment as described above, at each of the movement amount calculators 306a, 306b, and 306c, the movement amount and movement direction of the operating point of the drive force in the corresponding drive coil are calculated using the outputs from the three hall elements 32a, 32b, and 32c. With this, even when the operating point of the drive force and the position of the hall element do not coincide with each other, an accurate position of the movable member can be detected by calculating the movement amount at the operating point of the drive force using the hall element outputs.

Modification Examples

Hereinafter, modification examples of the embodiments will be described. Arrangements of the above-described drive coils 31a, 31b, and 31c, as well as the hall elements 32a, 32b, and 32c are not particularly limited provided the hall elements 32a, 32b, and 32c are not arranged inside the windings that form the drive coils 31a, 31b, and 31c. However, if in FIG. 5 the drive coils 31a, 31b, and 31c are arranged to give AA=210°, AB=330°, AC=90°, and 1A=1B=1C=1 and the hall elements 32a, 32b, and 32c are arranged to give αa=30°, αb=150°, αc=270°, and ra=rb=rc=r, that is, in the arrangement relationship as shown in FIG. 6 (same as the arrangement relationship in FIG. 2), the equation 2 may be simplified as the below equation 3.

$$\begin{pmatrix} \Delta PA \\ \Delta PB \\ \Delta PC \end{pmatrix} = \frac{1}{3} \begin{pmatrix} -2+\frac{l}{r} & 1+\frac{l}{r} & 1+\frac{l}{r} \\ 1+\frac{l}{r} & -2+\frac{l}{r} & 1+\frac{l}{r} \\ 1+\frac{l}{r} & 1+\frac{l}{r} & -2+\frac{l}{r} \end{pmatrix} \begin{pmatrix} \Delta pa \\ \Delta pb \\ \Delta pc \end{pmatrix} \quad \text{[Equation 3]}$$

By obtaining the present positions through the calculation with the equation 3, the calculation amount at the movement amount calculators 306a, 306b, and 306c may be mitigated. Accordingly, reductions in calculation processing time, memory resource, and consumed power may be achieved.

Moreover, if in FIG. 6 the elements 32a, 32b, and 32c are arranged inside the windings that form the drive coils 31a, 31b, and 31c to give 2r=1, that is, with the configurations as shown in FIGS. 2 and 3 and in the arrangement relationship as shown in FIG. 7 (same as the arrangement relationship in FIG. 3), the equation 3 may be simplified as the below equation 4.

$$\begin{pmatrix} \Delta PA \\ \Delta PB \\ \Delta PC \end{pmatrix} = \begin{pmatrix} 0 & 1 & 1 \\ 1 & 0 & 1 \\ 1 & 1 & 0 \end{pmatrix} \begin{pmatrix} \Delta pa \\ \Delta pb \\ \Delta pc \end{pmatrix} \quad \text{[Equation 4]}$$

By obtaining the present positions through the calculation with the equation 4, the calculation amount at the movement amount calculators 306a, 306b, and 306c may be further mitigated. Accordingly, further reductions in calculation processing time, memory resource, and consumed power may be achieved.

The present invention has been described based on the embodiments, but the present invention is not limited to the above embodiments. Needless to say, various modifications and applications may be made within the gist of the present invention. For example, in the above embodiments, the lens shake correction unit comprises the drive coils and the hall elements at the movable member and the permanent magnets at the fixed member; however, configurations in which the permanent magnets are provided at the movable member and the drive coils and the hall elements are provided at the fixed member may be adopted as a configuration of the lens shake correction unit 14. Also, the body shake correction unit comprises the permanent magnets at the movable member and the drive coils and the hall elements at the fixed member; however, configurations in which the drive coils and the hall elements are provided at the movable member and the permanent magnets are provided at the fixed member may be adopted as a configuration of the body shake correction unit.

Additionally, in the embodiments, the imaging apparatus comprises both the lens shake correction unit and the body shake correction unit; however, it may comprise only one of them.

Additionally, in the embodiments, the number of the hall elements is three; however, the number of the hall elements may be four or more.

What is claimed is:

1. A shake correction device comprising:
   a fixed member on which one of three drive coils and three drive magnets are arranged;
   a movable member on which one of an optical element and an image sensor, and the other one of the three drive coils and the three drive magnets are arranged, the movable member being movable with respect to the fixed member, and the three drive magnets facing the three drive coils;
   three detection magnets arranged on the fixed member or the movable member on which the three drive magnets are arranged;
   three detectors arranged on the fixed member or the movable member on which the three drive coils are arranged, wherein the three detectors face the three detection magnets and detect a change in magnetic flux generated according to a change in distance to the three detection magnets;

a movement amount calculator which calculates movement amounts and movement directions of operating points in the three drive coils based on outputs from the three detectors; and a drive controller which moves the movable member by controlling currents to apply to the three drive coils based on outputs from the movement amount calculator, wherein the three detectors and the three detection magnets form pairs, respectively, each pair being arranged between respective neighboring ones of the three drive coils, and wherein the movement amount calculator uses outputs from two or three of the three detectors to calculate the movement amounts and the movement directions of the operating points in the respective three drive coils.

2. The shake correction device according to claim 1, wherein the three drive coils are arranged such that their respective operating points locate on a same circumference.

3. The shake correction device according to claim 2, wherein the three drive coils are arranged such that three imaginary lines, which pass through the operating points in the respective three drive coils and are parallel to long sides of the respective three drive coils, cross one another.

4. The shake correction device according to claim 1, wherein the three detectors are each arranged in a region surrounded by a first imaginary circle passing through front ends of the respective three drive coils, and a second imaginary circle passing through rear ends of the respective three drive coils.

5. The shake correction device according to claim 4, wherein the three detectors are arranged to form an equilateral triangle.

6. The shake correction device according to claim 1, wherein the three detectors are each arranged on imaginary vertical lines passing through the operating points in the respective three drive coils and vertical to long sides of the respective three drive coils.

* * * * *